Dec. 19, 1944. J. MERCIER 2,365,424
AUTOMATIC LOCKING DEVICE FOR UNDERCARRIAGE
Filed Aug. 30, 1939

Inventor
Jean Mercier
By Mock, Blum
Attorneys

Patented Dec. 19, 1944

2,365,424

UNITED STATES PATENT OFFICE 2,365,424

AUTOMATIC LOCKING DEVICE FOR UNDERCARRIAGES

Jean Mercier, Neuilly-sur-Seine, France; vested in the Alien Property Custodian

Application August 30, 1939, Serial No. 292,640
In France December 6, 1938

4 Claims. (Cl. 244—102)

The present invention relates to retractable undercarriages.

The object of my invention is to prevent the possibility of collapsing of the undercarriage as long as the aircraft is not wholly air-borne.

According to an essential feature of my invention, the undercarriage includes a jack or other equivalent hydraulic control device, including a variable volume chamber adapted to be filled with liquid when the undercarriage is lowered, and means, interposed between the ground and the aircraft, for instance connected with an elastic yielding leg of the undercarriage, control the discharge of liquid from said changer so as to permit this discharge only when the aircraft is air-borne.

Other features of the present invention will result from the following detailed description of some specific embodiments thereof.

Figure 1:
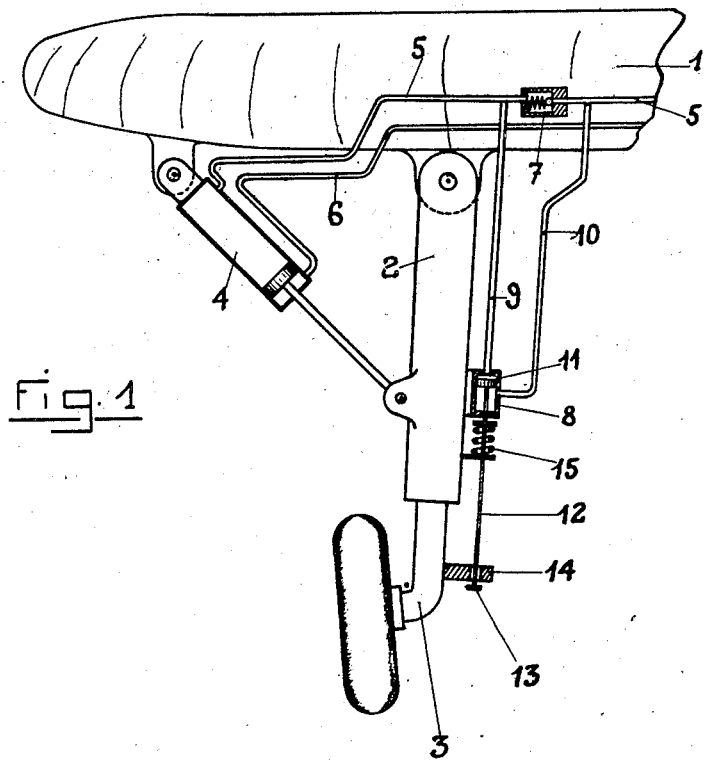

Preferred embodiments of the present invention will be hereinafter described with reference to the accompanying drawing, given merely by way of example, and in which:

Figure 1 diagrammatically shows, an undercarriage made according to an embodiment of my invention.

Figure 2:
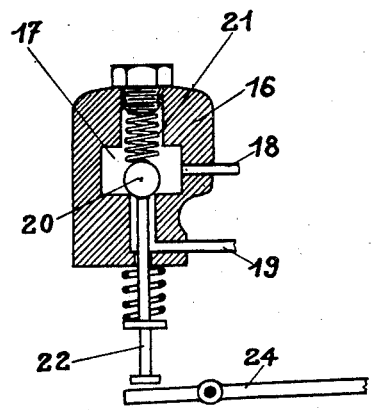

Figure 2 shows a valve system to be used in connection with an undercarriage of the type shown by Figure 1.

In Figure 1, an aircraft 1 is provided with a retractable undercarriage having an elastic yielding leg including an unsprung part 2 mounted, in telescopic fashion, on a sprung part forming the wheel stub axle 3. A double acting hydraulic jack 4, adapted to receive liquid through two pipes 5 and 6, controls the retracting and lowering of the undercarriage. Pipe 5, which serves to feed the liquid for the lowering of the undercarriage, is provided with a valve 7, adapted to permit the flow of liquid to the jack, but which prevents the flow in the opposed direction.

A valve device 8, mounted on part 2, is provided with two pipes 9 and 10, which connect it with the pipe 5, on either side of valve 7. This valve device comprises a slide-valve 11 actuated by a rod 12 provided with a stop 13 adapted to cooperate with a stop 14 fixed to the sprung part 3 of the undercarriage. When the undercarriage is lowered and the aeroplane is ground-borne, system 2—3 is compressed, so that stops 13 and 14 are not in contact with each other. A reaction spring 15 interposed between a stop carried by rod 12 and a stop carried by part 2, holds slide-valve 11 in closed position so that pipes 9 and 10 are not in communication with each other. The undercarriage cannot be retracted. When the aircraft lifts from the ground, system 2, 3 expands, stop 14 makes contact with stop 13, thus actuating rod 12 against the action of spring 15, and opening valve 11 so that pipes 9 and 10 are brought into communication with each other. The fluid contained in the upper chamber of the jack can discharge through pipes 5, 9, 10, 6, thus short-circuiting valve 7. The undercarriage can now be retracted.

In the embodiment of Figure 2, a body 16 forms a chamber 17 communicating on the one hand with a pipe 18 (corresponding to the part of pipe 5 of Fig. 1, located between the valve 7 and the jack) and on the other hand with a pipe 19 (corresponding to the part of pipe 5 of Fig. 1 located between the valve 7 and the source of liquid pressure). A ball 20 is urged by a spring 21 against the orifice of pipe 19. A rod 22, bearing against ball 20 is urged downwardly by a spring 23, and adapted to be moved upwardly by a lever 24. This lever is operated by the movement of compression or expansion of a resilient leg on the undercarriage.

When this undercarriage leg is compressed, lever 24 is free in the position shown by the drawing and spring 23 keeps rod 22 in the lower position. Ball 20 rests upon its seat; liquid cannot be discharged from the jack, that is to say from 18 to 19, but it can flow in the opposed direction. On the contrary, when the undercarriage has expanded, the aeroplane leaves the ground, lever 24 lifts rod 22, drives ball 20 upwardly against the action of spring 21, and the liquid contained in the jack now discharges from 18 to 19 so that the undercarriage can be retracted.

It has already been suggested to lock undercarriages of aircraft in the lowered position; however, most of the systems which have been proposed to that end have the shortcoming that they will not automatically prevent an accidental raising of the undercarriage at a time when the aircraft is on the ground. Most of the accidents arising out of an accidental raising of the undercarriage at the wrong time occur when the aircraft is not under the control of its usual pilot but, for example, being handled by members of a ground crew who may accidentally operate the controls for raising the undercarriage, and most of the systems known heretofore fail to prevent such accidents in the event of an untimely operation of the controls.

It has been suggested to connect the undercarriage by means of a Bowden wire or the like with a device which will lock the lever controlling the actuating jack, so that it cannot be operated as long as the aircraft is on the ground.

Likewise, it has been proposed to use the lowering of the wheels of an undercarriage which occurs when the aircraft takes off, to actuate a mechanical locking device which will by mere mechanical resistance prevent the raising of the undercarriage as long as the aircraft is on the ground.

Both the last-mentioned suggestions are unsatisfactory because they call for an addition of heavy devices to the structure of the aircraft. In the first case, a connection must be established between the wheels of the undercarriage and the control means for raising and lowering the undercarriage, which means are located in the far-distant pilot's cockpit. In the second instance, considerable mechanical resistance is required, so that the locking means have to be of considerable weight.

It is an outstanding feature of the present invention that the control means for preventing an accidental raising of the undercarriage are fully automatic, so that no raising is possible at all before the aircraft takes off and the control means are released. In addition, the control means are located within the undercarriage itself, so that no connection over any lengthy distance is required and this, together with the hydraulic nature of the control means, affords an economy in weight which is a very serious advantage over the devices known heretofore.

The structure, according to the present invention, has the further advantage that the undercarriage is securely locked until the airplane has actually left the landing surface.

In addition, the unlocking operation is instantaneously reversed should the plane drop back to the landing surface after having momentarily left the same.

The foregoing description is not intended to limit the present invention which extends to all changes, modifications and equivalents within the scope of the appended claims.

Having now described my invention, what I claim as new and desire to secure by Letters Patent is:

1. Retractable undercarriage for aircraft which comprises two telescoping members one secured to said aircraft and the other to a device for supporting the same on a landing surface, a hydraulic jack adapted to lower said undercarriage when said jack is being extended and to raise the same when said jack is being retracted, two conduits abutting at either end of said jack, respectively, for alternatingly supplying and discharging fluid to and from said jack to alternatingly extend and retract the same, valve means interposed in said conduit through which fluid is to be discharged from said jack in order to retract the same, said valve means being adapted to obstruct outflow of fluid through said conduit, means operatively connected to said device to remove said obstruction when said device is displaced away from said aircraft and to restore said obstruction when said device is displaced in the opposite direction, and yielding means to oppose any displacement of said device away from said aircraft.

2. Retractable undercarriage for aircraft which comprises two telescoping members one secured to said aircraft and the other to a device for supporting the same on a landing surface, a hydraulic jack adapted to lower said undercarriage when said jack is being extended and to raise the same when said jack is being retracted, two conduits abutting at either end of said jack, respectively, for alternatingly supplying and discharging fluid to and from said jack to alternatingly extend and retract the same, valve means interposed in said conduit through which fluid is to be discharged from said jack in order to retract the same, said valve means being adapted to obstruct outflow of fluid from said jack through said conduit, a by-pass conduit to circumvent the obstructed section of said conduit including said valve means, further valve means provided in said by-pass and including a valve chamber rigid with said member secured to said aircraft, and a movable valve element; a rod operatively connecting said element to said device, said movable valve element being adapted normally to obstruct communication through said valve chamber and, when displaced in accordance with a displacement of said device away from said aircraft, to afford communication through the same, a stop-member secured to said rod adjacent said valve chamber, a projection on said first mentioned one member, and a spring interposed between said stop member and said projection.

3. Retractable undercarriage for aircraft which comprises two telescoping members one secured to said aircraft and the other to a device for supporting the same on a landing surface, a hydraulic jack adapted to lower said undercarriage when said jack is being extended and to raise the same when said jack is being retracted, two conduits abutting at either end of said jack, respectively, for alternatingly supplying and discharging fluid to and from said jack to alternatingly extend and retract the same, valve means interposed in said conduit through which fluid is to be discharged from said jack in order to retract the same; said valve means including a valve chamber, a valve seat formed within the same, a movable valve element inside said chamber adapted, when applied against said seat, to obstruct flow of fluid through said chamber, yielding means inside said chamber to urge said movable valve element against said seat, and a pin extending between said movable valve element and the outside of said chamber; a stop member secured to said pin, a spring interposed between said stop member and the exterior wall of said chamber to force said pin outwardly with respect to said chamber, said pin being operatively connected to said device so that it will further penetrate into said chamber and unseat said movable valve element when said device is displaced away from said aircraft and so that it will recede from said chamber when said device is displaced in the opposite direction.

4. In a retractable undercarriage for aircraft which includes two telescoping members, one of which is secured to the aircraft and the other of which is secured to means for supporting the same on a landing surface wherein the telescoping members are resiliently directed towards their extending position, fluid operated retracting means to retract the undercarriage, conduit means through which fluid passes to permit the undercarriage to be retracted, valve means which is closed to prevent the flow of fluid through said conduit means, and means operated by the extending of said telescoping members to open said valve means whereby said valve means is closed when the undercarriage is being used to assist in supporting the aircraft and the valve means is open when the undercarriage is not being used to support the aircraft.

JEAN MERCIER.